United States Patent [19]

Reed

[11] Patent Number: 4,631,867

[45] Date of Patent: Dec. 30, 1986

[54] SPHERICAL PROJECTION-TYPE SCREEN FOR USE IN A VEHICLE SIMULATOR

[75] Inventor: John T. Reed, New Milford, Pa.

[73] Assignee: The Singer Company, Binghamton, N.Y.

[21] Appl. No.: 685,823

[22] Filed: Feb. 19, 1985

Related U.S. Application Data

[62] Division of Ser. No. 451,985, Dec. 21, 1982, Pat. No. 4,514,347.

[51] Int. Cl.$^4$ .............................................. B24B 5/00
[52] U.S. Cl. ...................................... 51/2 R; 434/40; 264/32; 51/166 FB; 52/81
[58] Field of Search ............... 51/2 R, 2 UA, 166 R, 51/166 TS, 166 FM, 166 MH, 166 T, 126, 55; 52/81; 264/46.6, 46.9, 162, 269.32; 350/125; 434/40

[56] References Cited

U.S. PATENT DOCUMENTS

| | | | |
|---|---|---|---|
| 2,273,074 | 2/1942 | Waller | 350/125 |
| 2,821,813 | 2/1958 | Degler | 51/2 R |
| 4,146,997 | 4/1979 | Diethorn | 52/81 |
| 4,350,489 | 9/1982 | Gdouin | 434/40 |

Primary Examiner—Frederick R. Schmidt
Assistant Examiner—Robert A. Rose
Attorney, Agent, or Firm—Douglas M. Clarkson

[57] ABSTRACT

A geodesic dome structure is described, i.e., a structure having a mathematically-derived surface. This new dome structure is formed of a single, one-piece layer of synthetic material and provides a one-piece, seamless screen to permit the viewing of a scene in a vehicle simulator in order to achieve a maximum of realism matching substantially real world conditions. One form of the structure for this geodesic dome is described with the single, one-piece layer of synthetic material bonded to a generally dome-shaped geodetic structure in order to provide sufficient strength for a free-standing structure. However, another form of the geodesic dome is described with the synthetic material formed of sufficient thickness to be strong enough to provide a free-standing structure, and the synthetic material may even be reinforced if desired. The method described of achieving this geodesic dome includes erecting a generally dome-shaped geodetic structure and applying a coating of a predetermined thickness of synthetic material to the inner surface of such a structure. Thereafter, this synthetic material is smoothed to provide the seamless screen for viewing a scene from a vehicle simulator. The method described also includes a tool stand erected in order to locate positively a pivot point from which a tool boom is movable in order to achieve the accuracy desired for the inner, smooth, one-piece, seamless screen surface.

9 Claims, 4 Drawing Figures

SPHERICAL PROJECTION-TYPE SCREEN FOR USE IN A VEHICLE SIMULATOR

This application is a division, of application Ser. No. 451,985, filed 12/21/82, now U.S. Pat. No. 4,514,347.

BACKGROUND OF THE INVENTION

1. Field of the Invention

This invention, generally, relates to vehicle simulation and, more particularly, to a new and improved geodesic dome structure and a method of manufacturing same, such dome structure especially being useful in flight simulation.

2. Background Art

The need for more extensive and specialized training has increased with the increase in today's high performance aircraft that have become more and more complex. To obtain such training, a student pilot must either be provided with actual training and experience in the aircraft which he is to fly, or he must be provided with training in a simulator of such aircraft.

However, there are certain emergency procedures and maneuvers that simply can not be accomplished by training in the actual aircraft because of the dangers of the actual real life environment. This is especially true for single pilot aircraft. Therefore, for such maneuvers or emergency procedures, training in a simulator of the aircraft is particularly advantageous.

Furthermore, with the increase in expense of flight fuel in recent years, the time required in training within such an actual aircraft makes this form of training cost excessive, particularly when taken in consideration with the wear and tear on the actual aircraft. Consequently, aircraft simulators are being called upon to take on more and more of the aircraft training missions. For such training to be effective, the aircraft simulator must reproduce faithfully the environment that the trainee would face in an actual flight.

For those aircraft types in which a pilot, co-pilot, navigator, and the like view the outside real world through relatively small windows, the visual part of the simulator is customarily accomplished through the use of a suitable cathode ray tube (CRT) positioned at each window. However, this manner of reproducing the scenes to be simulated by the use of CRT's becomes impractical when a trainee pilot is in the type of aircraft using a larger window, such as a bubble-type or clear dome. This type of scene depicts nearly 360° of view.

Much attention has been given to an appropriate structure for creating a screen that is virtually a complete dome to provide a viewing surface on the inside.

DESCRIPTION OF THE PRIOR ART

In the prior art, numerous training and simulator apparatus have been constructed which embody a position from which a trainee or a pilot can manipulate controls and observe a response in a projected visual image. For example, the trainee or pilot is positioned in a mockup of a boat, submarine, airplane, military tank or other vehicles, in which he manipulates controls, such as a wheel, stick or throttle, the observed visual scene responds in a manner which simulates corresponding movement of an actual vehicle in the real world.

The prior art patents which are known to have relevant disclosures are as follows:

U.S. Pat. Nos. 2,273,074; 3,607,584; 3,718,989; 3,998,522 and 4,124,277.

However, not withstanding the extensive efforts that have been made in this field, there has not yet been shown a structure for the manufacture of a satisfactory, low cost, yet effective dome structure. There is much work being done today to accomplish such a dome type structure which has the degree of accuracy in its curvature that is required in the simulator field in order to develop the required realizm in a projected scene. Moreover, from the prior suggestions to divide a mirror surface into a "series of mirrors" or that a "screen is composed of a number of small screen surfaces", there is not one disclosure of how it can be done or how to do it inexpensively.

SUMMARY OF THE INVENTION

It is a principal object of the invention to provide a new and improved structure for exhibiting projected images with sufficient realism for use in a projected-image visual system of a simulator.

It is also an object of the invention to provide such a dome structure that is inexpensive to manufacture, yet it maintains an unusually high degree of accuracy in the curvature of the inner surface to admit of the realism required in visual systems of a simulator.

Such a dome which is manufactured for use as a spherical projection-type viewing surface in a vehicle simulator which admits of a maximum of realism matching substantially real world conditions has a generally geodetic dome having sufficient strength to be a free-standing structure with a curved, substantially dome-shaped, projection screen formed of a single, one-piece layer of synthetic material attached to the geodetic dome. The innermost portion of this dome-shaped structure is formed to a substantially smooth mathematically-derived surface which provides the seamless screen for viewing a scene in the vehicle simulator.

In another aspect of the invention, the geodetic dome having sufficient strength to be a free-standing structure is removed after the synthetic material is formed with the inner surface as defined hereinabove. While it has been found that sprayed in place foam provides a sufficiently strong synthetic material for this type of use, any suitable synthetic material having the required strength as will be described hereinafter would suffice.

In still another aspect of the invention a method of manufacturing the dome is described in detail as included in the following steps: erecting a geodetic generally dome-shaped structure having an inner surface, applying a coating of a preselected thickness of a suitable synthetic material to this inner surface, and then smoothing the inner portion of the coating of the synthetic material to form a substantially smooth, one-piece, seamless screen.

DESCRIPTION OF THE DRAWINGS

The foregoing other and further objects, features and advantages will appear more fully from the detailed description of the presently preferred embodiments of the invention and from the appended claims, both viewed in conjunction with the accompanying drawings, in which:

PRESENTLY PREFERRED EMBODIMENTS

As used hereinafter the term "geodetic" shall mean a thing which determines size and shape generally. The term "geodesic" identifies a mathematically-derived surface.

Figure 1:
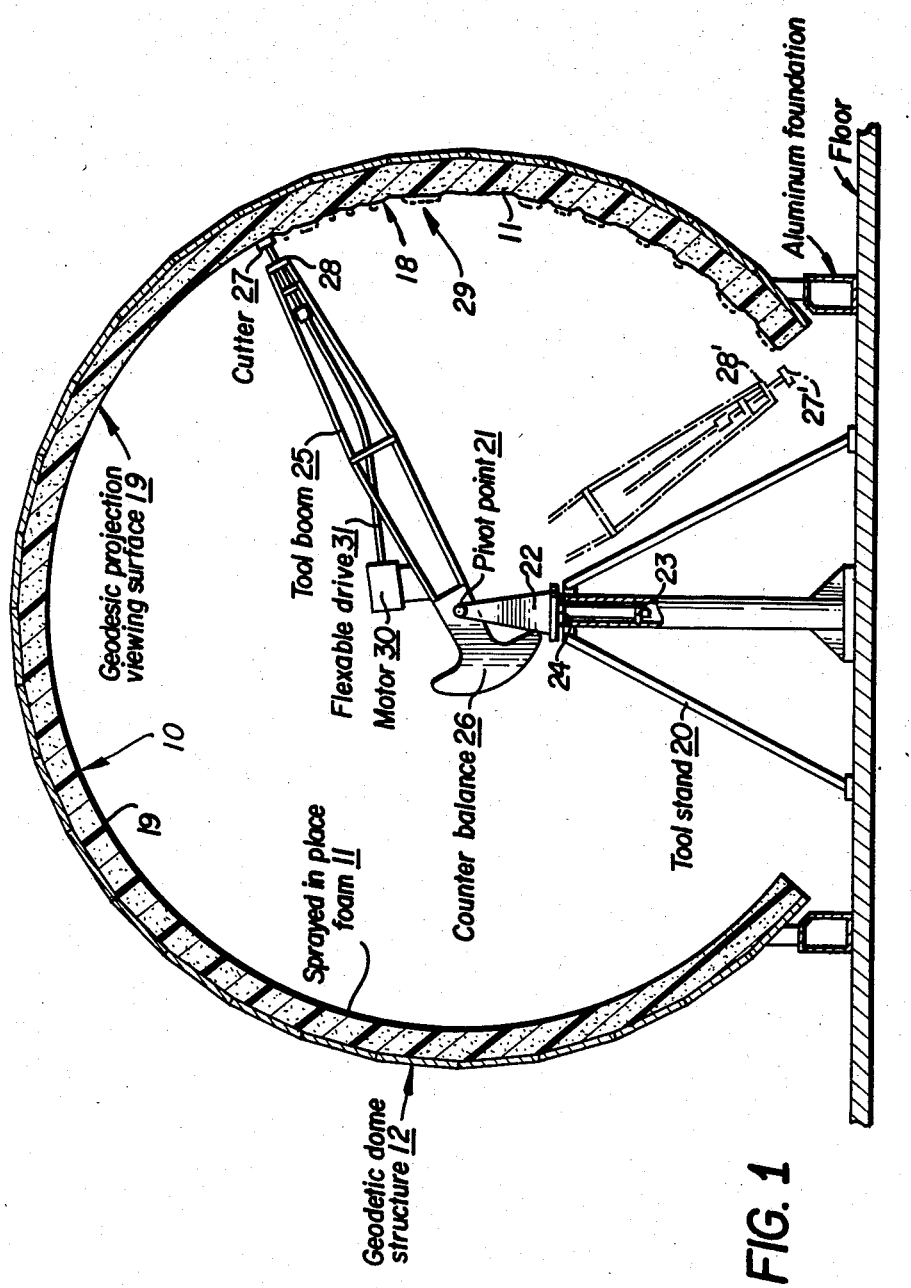
FIG. 1 is a view, partly in cross section, of a dome-shaped structure, constructed in accordance with the principles of the invention.

Referring now to FIG. 1 of the drawings, the reference numeral 10 identifies generally a geodesic dome formed of a sprayed in place foam or other suitable synthetic material 11. The foam 11 is sprayed in place against a geodetic dome structure, such as any of those available from Spitz Space Systems, Inc., Chadds Ford, Pennsylvania 19317.

The foam, or other suitable synthetic material, identified by the reference numeral 11, is of a predetermined thickness, i.e., if the geodetic dome structure 12 is to remain in place, the thickness of the foam 11 may be somewhat less than if the geodetic dome structure 12 is to be removed. In those instances when the geodetic dome structure 12 is to be removed after manufacture of the synthetic material dome 11 is completed, the thickness of the material 11 is determined by that which is sufficient to render it of sufficient strength to be a free-standing structure.

Figure 4:
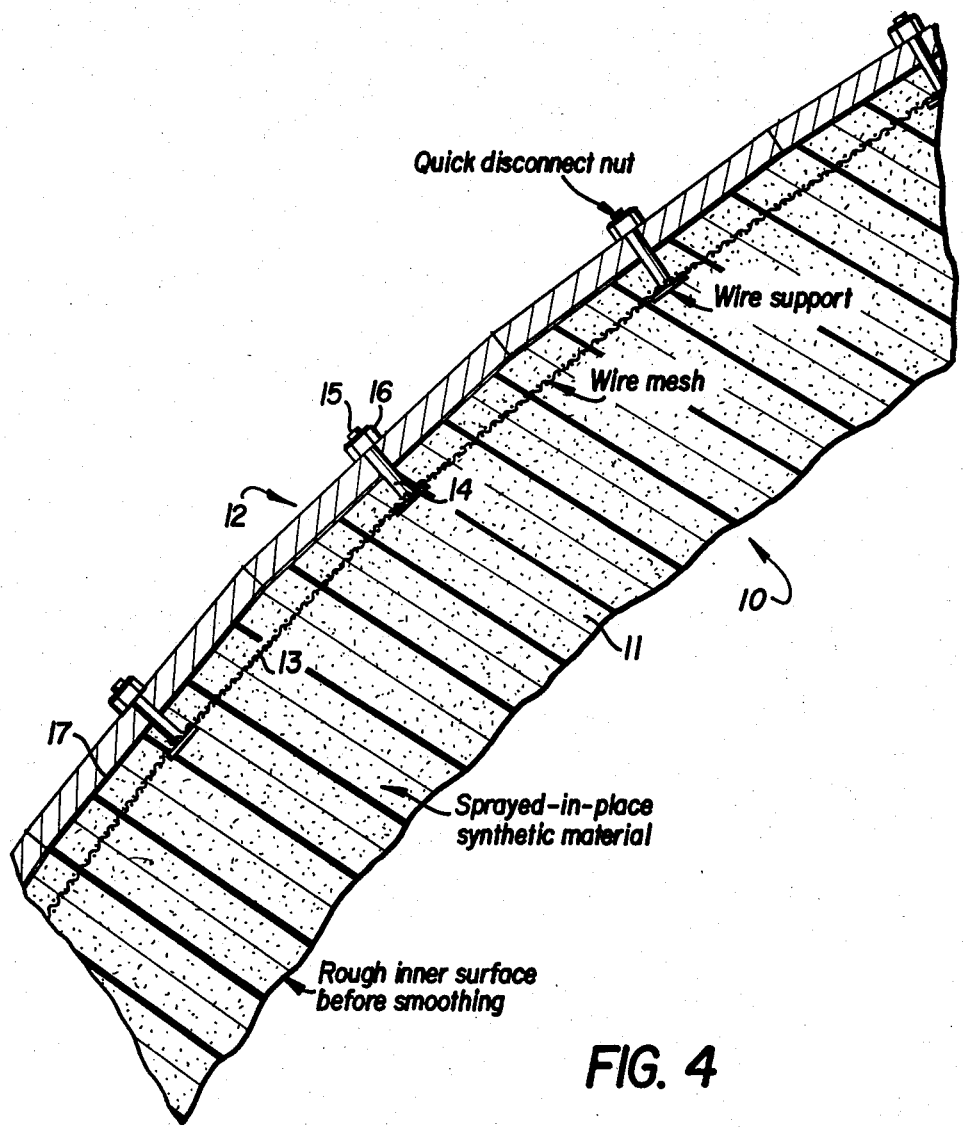
FIG. 4 is a view of a part of a dome-shaped structure showing a modified form of the invention.

Referring now to FIG. 4 of the drawings, an enlarged view of a portion of the geodesic dome structure 10 reveals the geodetic structure 12 and the synthetic material 11 more clearly. If a customary strength analysis reveals that reinforcement is necessary or is desirable, a reinforcing wire mesh 13 is located by, for example, a plurality of pins 14 spaced apart in any desired pattern, and each pin has a threaded end 15 to receive a nut 16 to permit quick disconnect of the sections of the geodesic dome structure 12 from each of these pins 14, so that after completion of the synthetic material 11, the sections of the geodetic dome structure 12 may be removed.

In accordance with one aspect of the invention, the respective sections of the geodetic dome structure 12 are removable more easily if, before the synthetic material 11 is applied thereto, the inner surface of each section of the geodetic dome structure 12 is provided with a suitable layer or other coating 17, which may be of foil or paper, or any desired substance, to permit the sections of the geodetic dome structure 12 to be separable from the synthetic material 11 easily.

Referring again to FIG. 1 of the drawings, the reference numeral 18 identifies the initial rough surface of the synthetic material 11 as it exists right after it is applied to the geodetic dome structure 12. Another aspect of the invention is to obtain the smoothed geodesic projection viewing surface 19 from the initial, rough surface 18.

This is accomplished, in accordance with this invention, by, first erecting a suitable tool stand 20. One of the functions which the tool stand 20 accomplishes is to locate, structurally, a pivot point 21 which is the center of curvature of the completed geodesic projection viewing surface 19.

The pivot point 21 is located on a pivotable structure 22 supported by suitable bearings 23 and 24 on the tool stand 20. The structure 22 is bifurcated and is of sufficient height to locate the pivot point 21 sufficiently high above the bearing 24 so that it can support a tool boom 25 pivotally at the pivot point 21.

The tool boom 25 has an appropriate counter-balance weight 26 which is shaped to swing easily and readily between the bifurcations of the structure 22.

The tool boom 25 supports a cutter 27 at its outermost end 28 in any appropriate manner so that it may be indexed radially and accurately from a position as shown by the reference numerals 27 and 28 to a position as shown by the reference numerals 27' and 28', so that the cutter 27 will remove only the high points 29 first from the initial rough surface 18 of the synthetic material 11.

A motor 30 is supported on the tool boom 25 as close to the pivot point 21 as possible, in order to reduce the effect of its weight, and the motor 30 is connected to rotate the cutter 27 through a flexible drive shaft 31. Of course, the motor 30 could be positioned on a direct line, if desired, between the pivot point 21 and the cutter 27, but it is shown positioned to one side of the pivot point 21 for greater ease in connecting the air supply to it in order to drive it.

Figure 2:
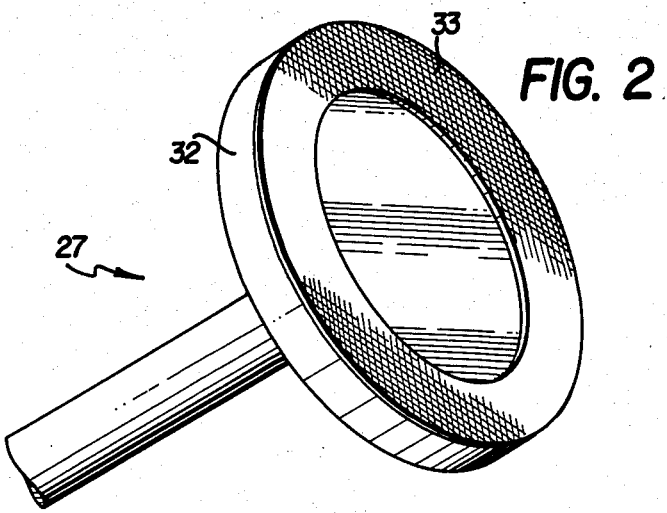
FIG. 2 is a perspective view of a cutting element used in connection with the construction of the dome-shaped structure shown in FIG. 1.

Referring now to FIG. 2 of the drawings, a disk 32 has an abrasive surface 33 around the periphery of the disk 32. Such a cutter 27 is readily available commercially.

Figure 3:
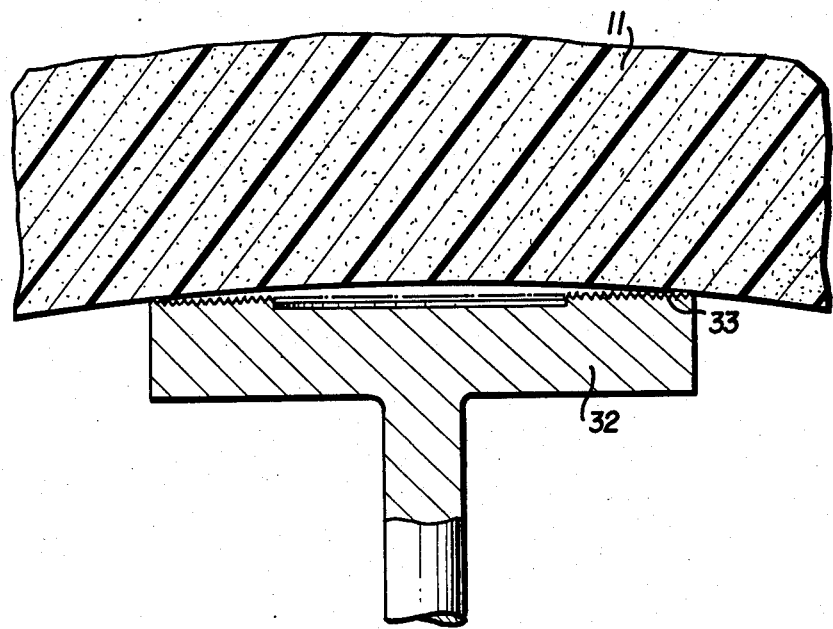
FIG. 3 is an enlarged view of a portion of the cutting element shown in FIG. 2 in cutting position relative to the synthetic material.

In FIG. 3 of the drawings, the relationship of the abrasive surface 33 of the disk 32 relative to the synthetic material 11 is shown in better detail, because the view of a portion of the cutter 27, of FIG. 2, is enlarged.

Article of Manufacture

The geodesic dome manufactured in accordance with the present invention is uniquely adapted for use as a spherical projection-type viewing surface in a vehicle simulator, because it substantially maximizes realism matching those in the real world. Such a dome involves a curved, substantially dome-shaped, projection screen formed of a single, one-piece layer of snythetic material with sufficient strength to be a free-standing structure. This strength is obtained in any one of several different ways.

One way of maintaining sufficient strength in the geodesic dome structure is to erect, first, a geodetic dome structure which is readily available commercially, and then, to have the synthetic material supported from such a dome. Another way, is to make the thickness of the synthetic material 11 sufficient so that it will be a free-standing structure, once it is completed.

A third way, in accordance with the invention, is to have the geodesic dome of synthetic material 11 formed initially with a suitable reinforcing material 13 embedded therein.

After the synthetic material 11 is formed in its free-standing position, the inner portion of this dome-shaped structure of synthetic material is formed to a substantially smooth mathematically-derived surface 19, so that the inner portion forming the viewing surface 19 is a one-piece, seamless screen for viewing various preselected scenes in a vehicle simulator.

A dome manufactured with this structure would be exceedingly light in weight and unusually durable because it is largely of a synthetic material.

A geodesic dome manufactured with these features, identified above, will have a one-piece, seamless inner surface 19 which is uniquely adapted for a screen to view a scene, and it will avoid the slow, painstaking assembly that is presently required to assemble hundreds of pieces to make a perfectly aligned and fastened dome structure. Moreover, it avoids the approximately 1,500 linear feet of seams that would be generated in a 35 foot diameter dome which requires filling and surfacing, which is all done by hand.

It has been estimated that a dome which is manufactured with the features identified above will have approximately 67% lower production cost. There are no seams to finish, and the geodesic dome of the invention admits of unusual thermal stability, yielding accompanying dimensional stability.

Due to the superior insulating properties provided by the synthetic material lining the inside of the geodesic dome manufactured in accordance with the principles of the present invention, environmental stability and control of the interior space will be easier and far less costly to maintain.

Method of Manufacture

The method of manufacturing the geodesic dome of the invention involves certain unique steps also. The method in accordance with the invention will produce the geodesic dome described above in substantial detail for use as a spherical, projection-type viewing surface in a vehicle simulator to present to an observer a maximum of realism which matches substantially real world conditions.

This method involves erecting, first, a geodetic generally dome-shaped structure having an inner surface, and then, applying a coating of a predetermined thickness of synthetic material to this inner surface.

Next, the inner portion of the coating of synthetic material is smoothed to form a substantially smooth, one-piece, seamless screen. The coating step, of course, includes spraying, which is a present day acceptable method of applying a suitable synthetic material, such as a synthetic foam, and the step of smoothing includes grinding, of course.

As described above, the step of erecting a geodetic structure includes the step of assembling a plurality of sections having predetermined size and shape and being formed of a material so that the structure is of sufficient strength to be free-standing. So that each of these sections is readily removable after the synthetic foam or other synthetic material is set in place, the inner surface in each section is formed with a predetermined facing material.

If a relatively light weight geodesic dome is required, it can be obtained in accordance with the invention by removing the geodetic structure. If additional strength is needed for the relatively light weight geodesic dome structure, an additional step may be added to the method of manufacturing such a structure, that of reinforcing the predetermined thickness of synthetic material.

The geodetic dome which is purchased from any suitable vendor, such as the one named hereinabove, may be preferably of such materials as aluminum, fiberglass, fireproof wood or any combination thereof. These domes are assembled easily and quickly without the need of special tools or knowhow.

The foam synthetic material is applied, preferably by spraying, over the entire interior surface of the geodetic dome structure in sufficient thickness to produce the strength desired. Such a thickness may vary from one inch to one foot, if desired. The tool stand 20, then, is placed in the dome structure and is secured to the floor at a point where the polar axis of the dome and the floor intersect. The tool stand 20 has a pivot point 21 at its top end that is coincident with the center of curvature of the dome surface structure.

Next, the tool boom 25 is placed on the tool stand 20 at the pivot point 21. This tool boom 25 will have a special cutter 27 at its outer end 28 that will be precisely located at the 17 feet, 6 inch radius required to produce a 35 foot diameter spherical screen, for example.

The cutter 27 is rotated rapidly by a motor 30 at the opposite end of the tool boom 25, and a flexible shaft 31 interconnects the motor 30 with the cutter 27.

The tool boom is counter-balanced by a weight 26 so that little or no effort is required to lift or move it about as will be described. The cutter 27 is turned at a high speed by the motor 30, and with the cutter 27 turning at this high speed, the outer end of the tool boom 25, is traversed over the entire interior surface 19 permitting the cutter to generate the spherical surface 19 desired by machining. The resulting surface 19 will be completely free of seams, cracks and the like.

With the finishing of the viewing surface 19 as described, the tool boom 25 is removed and a somewhat shorter painting boom is placed in position on the tool stand 20 to be pivoted at the same point 21. Such a step permits spraying on the screen surface-fillers and coats of paint as desired to completely finish the surface 19. Such a painting boom will hold the spray guns at a specific distance from the surface to enable a uniform coating to be applied.

The painting boom and the tool stand 20 now are completely removed from the dome structure because it is completed, and now the dome surface 19 may be tested by inserting the simulator, visual system and other equipment as desired.

In view of the detailed description hereinabove, various modifications of the preferred form of the invention will occur to one skilled in this art. Accordingly, the description and modifications are to be considered as illustrative only, the true spirit and scope of the invention being that as defined by the claims appended hereto.

I claim:

1. A geodesic dome manufactured for use as a spherical projection-type viewing surface in a vehicle simulator to present a maximum of realism matching substantially real world conditions, comprising:
   a curved, substantially dome-shaped, projection screen formed of a single, one-piece layer of synthetic material with sufficient strength to be a free standing structure, and
   means to remove a portion of the inner portion of said curved, substantially dome-shaped, one-piece layer of synthetic material to achieve a substantially smooth mathematically-derived surface,
   so that the inner portion forming said viewing surface provides a one-piece, seamless screen for viewing a scene in said vehicle simulator.

2. The geodesic dome in accordance with claim 1 including a generally dome-shaped geodetic structure with said single, one-piece layer of synthetic material bonded thereto to achieve sufficient strength to provide said free-standing structure.

3. The Geodesic dome in accordance with claim 1 including moveable means to support said means to remove a portion of synthetic material for movement in an accurate, mathematically-derived path.

4. The Geodesic dome in accordance with claim 3 wherein said moveable means includes means to define the geometric center of said mathematically-derived surface, and includes pivotal means to support said moveable means for pivoting about said center.

5. The Geodesic dome in accordance with claim 4 wherein said moveable means supported for pivotal movement about the center of said Geodesic dome includes working tool means supported on said moveable means to perform predetermined work on said inner portion of said dome-shaped structure.

6. The Geodesic dome in accordance with claim 5 wherein the predetermined work to be performed on said inner portion of said dome-shaped structure is grinding, and said working tool means is in the form of a grinder.

7. The Geodesic dome in accordance with claim 5 including means supported also on said moveable means and positioned relative to said working tool means to counterbalance the weight of said tool means relative to said center.

8. The Geodesic dome in accordance with claim 5 wherein said pivotal means includes a bifurcated support to permit continuous movement of said working tool means from a beginning point on the lowermost perimeter of said dome vertically to a corresponding point on the lowermost perimeter that is opposite the beginning point.

9. The Geodesic dome in accordance with claim 8 including also bearing means to support said moveable means to permit continuous movement in a horizontal direction a full 360 degrees.

* * * * *